(12) United States Patent
Yeggy

(10) Patent No.: US 11,041,591 B2
(45) Date of Patent: *Jun. 22, 2021

(54) LOW PROFILE CYLINDER MOUNT

(71) Applicant: Hexagon Technology AS, Alesund (NO)

(72) Inventor: Brian C. Yeggy, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,417

(22) Filed: Apr. 21, 2020

(65) Prior Publication Data

US 2020/0248874 A1    Aug. 6, 2020

Related U.S. Application Data

(63) Continuation of application No. 16/119,181, filed on Aug. 31, 2018, now Pat. No. 10,670,191.

(Continued)

(51) Int. Cl.
*F16M 1/00* (2006.01)
*F17C 13/08* (2006.01)
*B60K 15/03* (2006.01)

(52) U.S. Cl.
CPC .......... *F17C 13/084* (2013.01); *F17C 13/083* (2013.01); *B60K 15/03006* (2013.01);
(Continued)

(58) Field of Classification Search
CPC ................. F17C 13/084; F17C 13/083; F17C 2201/0104; F17C 2201/0109;
(Continued)

(56) References Cited

U.S. PATENT DOCUMENTS 2,729,846 A * 1/1956 Reed .................. H02K 5/24
16/109
4,920,696 A * 5/1990 Mawby ................ F25D 23/006
248/674

(Continued)

FOREIGN PATENT DOCUMENTS

CA     2 636 100 A1   12/2009
CN     1488056 A      4/2004

(Continued)

OTHER PUBLICATIONS

Office Action, including search report, for Chinese Patent Application No. 201880060676.6, dated Apr. 22, 2021, 14 pages.

*Primary Examiner* — Todd M Epps
(74) *Attorney, Agent, or Firm* — Mai-Tram D. Lauer; Westman, Champlin & Koehler, P.A.

(57) ABSTRACT

In assembly of a pressure vessel and mount, the pressure vessel has a diameter and a length and includes a substantially cylindrical body and a boss neck. The substantially cylindrical body has a domed end and tapers from a portion having the diameter to the boss neck at the domed end. The mount includes a central plate and first and second flanges. The central plate has an aperture therethrough configured to accept a portion of the boss neck. The first and second flanges are located at opposed first and second sides of the central plate, respectively, and are configured to extend (Continued)

toward the body. The assembly occupies no more than a rectangular prism space defined by the length, a width equal to the diameter, and a height equal to the diameter of the substantially cylindrical body.

19 Claims, 3 Drawing Sheets

Related U.S. Application Data

(60) Provisional application No. 62/564,507, filed on Sep. 28, 2017.

(52) U.S. Cl.
CPC ............... *B60K 2015/03328* (2013.01); *F17C 2201/0104* (2013.01); *F17C 2201/0109* (2013.01); *F17C 2201/035* (2013.01); *F17C 2201/056* (2013.01); *F17C 2205/0192* (2013.01); *F17C 2205/0196* (2013.01); *F17C 2221/033* (2013.01); *F17C 2270/0168* (2013.01); *F17C 2270/0178* (2013.01)

(58) Field of Classification Search
CPC ......... F17C 2201/035; F17C 2201/056; F16M 13/02; B60K 15/03006; B60K 2015/03328
USPC ..... 248/635, 674, 675, 676, 312; 52/745.31, 52/747.13
See application file for complete search history.

(56) References Cited

U.S. PATENT DOCUMENTS

| | | | | |
|---|---|---|---|---|
| 5,295,653 | A * | 3/1994 | Miyazaki | B21D 53/00 248/121 |
| 5,524,860 | A * | 6/1996 | Ives | F04B 39/12 248/674 |
| 6,378,832 | B1 * | 4/2002 | Li | F16F 1/3849 248/635 |
| 7,614,855 | B2 * | 11/2009 | Cook | F04B 17/03 264/674 |
| 7,976,290 | B2 * | 7/2011 | Wang | F04B 39/0016 417/360 |
| 10,670,191 | B2 * | 6/2020 | Yeggy | F17C 13/083 |
| 2003/0006439 | A1 | 1/2003 | Bailey | |
| 2009/0133948 | A1 | 5/2009 | Ijaz et al. | |
| 2010/0018591 | A1 | 1/2010 | Jauss | |
| 2015/0122821 | A1 | 5/2015 | Nettis | |

FOREIGN PATENT DOCUMENTS

| | | |
|---|---|---|
| CN | 101039813 A | 9/2007 |
| CN | 101500837 A | 8/2009 |
| CN | 104094043 A | 10/2014 |
| CN | 203975535 U | 12/2014 |

* cited by examiner

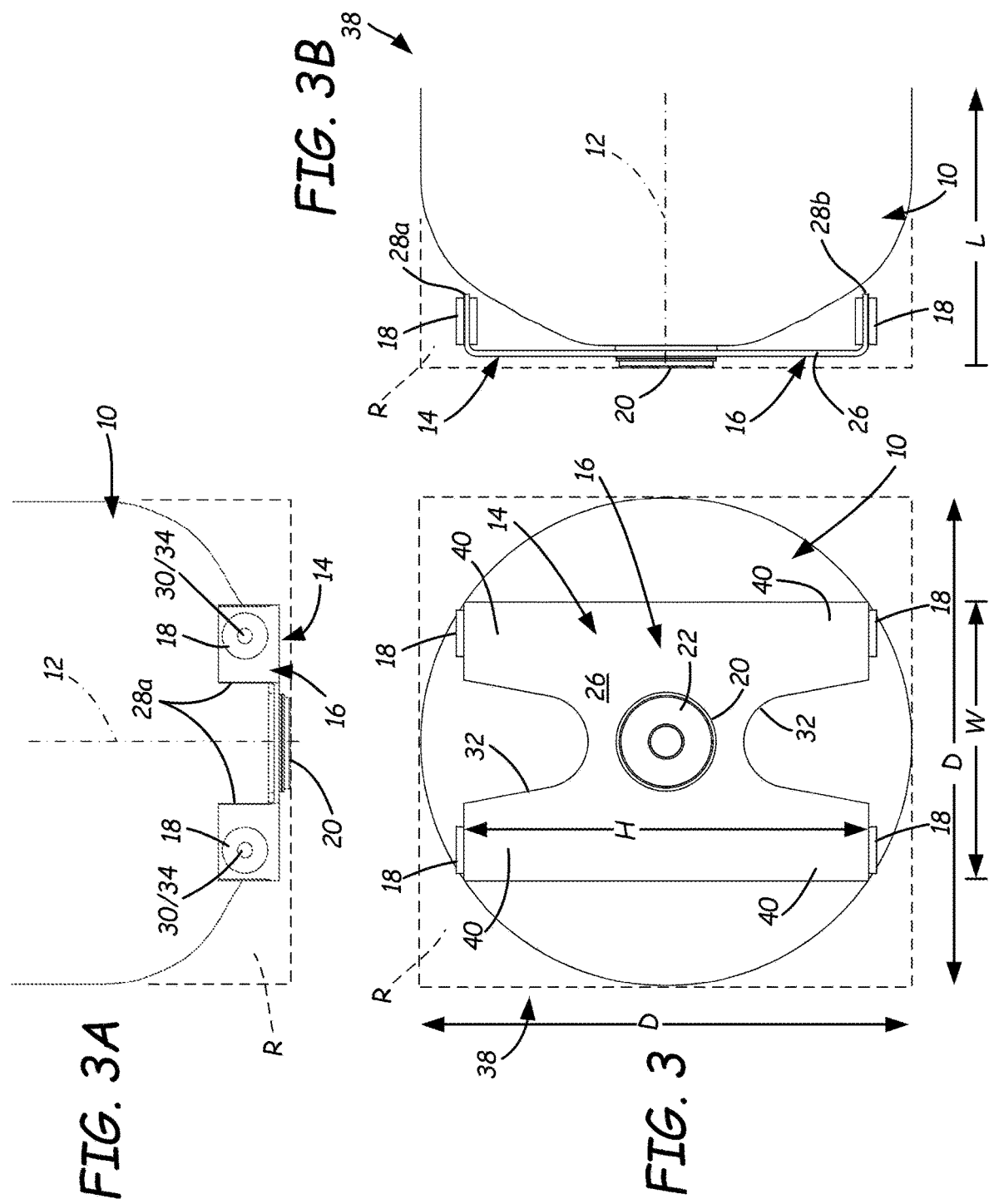

LOW PROFILE CYLINDER MOUNT

CROSS REFERENCE TO RELATED APPLICATION

This application is a continuation of U.S. patent application Ser. No. 16/119,181, filed Aug. 31, 2018, which claims the benefit of priority from U.S. provisional patent application No. 62/564,507, filed on Sep. 28, 2017; the contents of these priority applications are fully incorporated by reference herein.

BACKGROUND OF THE INVENTION

The present disclosure relates generally to fluid storage and specifically to a mounting bracket for a fluid containment cylinder and a method for mounting the fluid containment cylinder using its boss. A particularly suitable fluid containment cylinder is a pressure vessel. A typical pressure vessel includes a load bearing outer shell and a fluid impermeable inner liner.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. Details relevant to the formation of an exemplary pressure vessel are disclosed in U.S. Pat. No. 4,838,971, entitled "Filament Winding Process and Apparatus," which is incorporated herein by reference.

An elastomeric or other non-metallic resilient liner or bladder often is disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, the liner is formed of blow molded high density polyethylene (HDPE).

The composite construction of the vessels provides numerous advantages such as lightness in weight and resistance to corrosion, fatigue and catastrophic failure. These attributes are due at least in part to the high specific strengths of the reinforcing fibers or filaments. Such composite vessels are commonly used for containing a variety of fluids under pressure, such as hydrogen, oxygen, natural gas, nitrogen, methane, propane, and rocket or other fuel, for example. Generally, pressure vessels can be of any size or configuration. The vessels can be heavy or light, single-use (i.e., disposable), reusable, subjected to high pressures (greater than 50 psi, for example), low pressures (less than 50 psi, for example), or used for storing fluids at elevated or cryogenic temperatures, for example. Descriptions relevant to pressure vessels are presented in U.S. Pat. No. 5,476,189, entitled "Pressure vessel with damage mitigating system," which is hereby incorporated by reference.

Composite pressure vessels of the character described above originally were developed for aircraft and aerospace applications primarily because of the critical weight restrictions in such vehicles. As compressed natural gas (CNG) has become more widely used in ground-based vehicles such as buses and cars, however, the composite pressure vessel has become more widely used. The structural requirements of a pressure vessel are such that a generally cylindrical shape having rounded ends is a highly-desirable form factor from a standpoint of both strength and packing efficiency. However, the rounded shape can make securing such a pressure vessel to a vehicle difficult.

The neck of the compressed gas cylinder provides a structural protrusion suitable for attachment by a collar or similar device. Certain known designs make use of this feature to secure a gas cylinder. However, such designs suffer from a number of drawbacks. Some designs handle misalignment poorly and can place substantial stresses on the neck structure in the event of misalignment. Other designs inadequately secure the neck, so that there is a risk that the cylinder may detach from the mount under certain conditions. Moreover, in some cases, the cylinder can rotate about the principal axis of the cylinder, thereby placing stress on connection lines or other attached hardware. Additionally, many designs have space requirements that accordingly leave less volume available in a limited envelope for the body of the fluid containment cylinder.

BRIEF SUMMARY OF THE INVENTION

In one aspect, a mount is configured for attachment to a neck of a pressure vessel, the pressure vessel having a substantially cylindrical body having a diameter. The mount includes a central plate, a first flange, a second flange, a first vibration isolator, a second vibration isolator, and a retainer. The central plate has a height that is approximately equal to or less than the diameter, a width that is approximately equal to or less than the diameter, and an aperture therethrough. The first flange is located at a first side of the central plate, the first flange being oriented substantially perpendicular to the central plate and configured to extend toward the body. The second flange is located at a second side of the central plate opposite the first side, the second flange being oriented substantially perpendicular to the central plate and substantially parallel to the first flange, the second flange configured to extend toward the body. The first vibration isolator is configured for attachment to the first flange. The second vibration isolator is configured for attachment to the second flange. The retainer is configured for attachment proximate the aperture and is configured to accept a portion of the neck of the pressure vessel.

In another aspect, an assembly of a pressure vessel and mount is described. The pressure vessel includes a substantially cylindrical body having a diameter and a length and a neck. The mount includes a central plate, a first flange, and a second flange. The central plate has an aperture therethrough configured to accept a portion of the neck of the pressure vessel. The first flange is located at a first side of the central plate and extends toward the body. The second flange is located at a second side of the central plate opposite the first side and extends toward the body. The assembly occupies no more than a rectangular prism space defined by the length, a width equal to the diameter, and a height equal to the diameter.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

The disclosed subject matter will be further explained with reference to the attached figures, wherein like structure or system elements are referred to by like reference numerals throughout the several views.

FIG. 3 is an end view of the pressure vessel and mount assembly of FIG. 1.

FIG. 3A is a partial top view of the pressure vessel and mount assembly.

FIG. 3B is a partial side elevation view of the pressure vessel and mount assembly.

Figure 1:
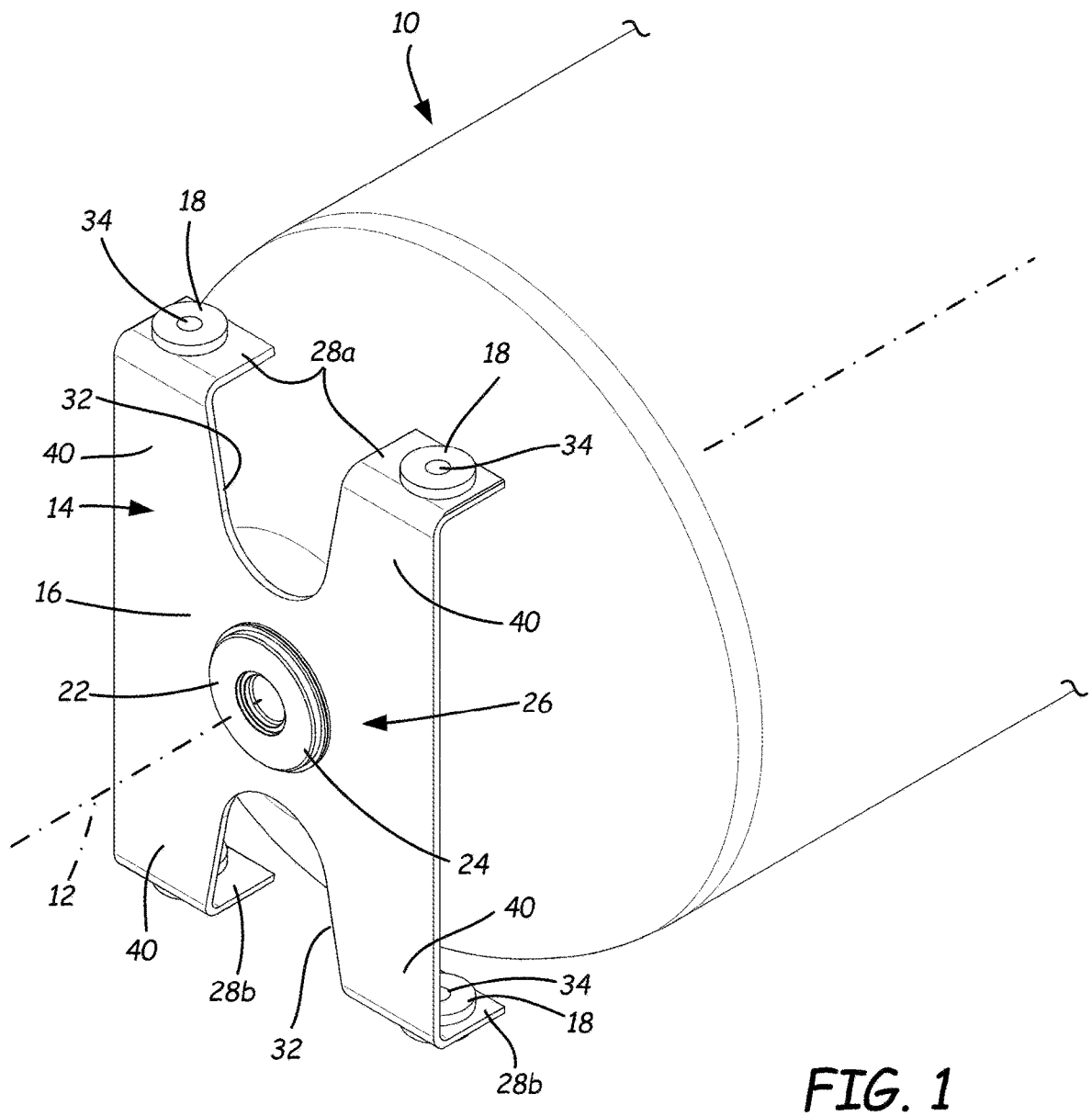
FIG. 1 is a partial perspective view of a pressure vessel having an exemplary embodiment of a low-profile cylinder mount attached thereto.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION OF THE INVENTION

U.S. Pat. No. 6,986,490 by Eihusen et al., entitled "Method and apparatus for mounting a fluid containment cylinder," which is hereby fully incorporated by reference, describes a prior art vessel securement method and apparatus that provides for securely fastening a pressure vessel against axial and rotational movement while enabling the pressure vessel mounting structures to accommodate a degree of misalignment without unduly stressing the neck of the pressure vessel. However, pressure vessels are often mounted in locations having limited space, such as in vehicles. In such locations, the extended neck 306, frame 302, bearing 310 and securing collar 320 require valuable space.

A pressure vessel having a generally cylindrical shape with dome-shaped ends is quite suitable for high-pressure containment of fluids. However, this shape is not the most efficient in terms of use of volume, as standard mounting methods typically consume space either around the circumference of the pressure vessel (such as when straps around the cylinder body are used) or at the ends of the cylinders (such as with the use of boss mounting methods, wherein mount structures are attached to and extend from the length of the vessel boss). Because a pressure vessel typically is not made in a substantially rectangular shape, the domed ends leave unused space adjacent the hemispherical ends of the cylinder.

The current concept uses a mount structure that is substantially confined to this unused space. The disclosed bracket mounts to a vehicle structure using commercially available vibration isolators. These isolators protect the pressure vessel from vehicle vibrations and also absorb axial growth of the cylinder under pressure. The mounting bracket can additionally be formed of a spring steel to absorb increased axial motion. In the illustrated embodiment, the bracket is attached to an exterior of the boss with a snap-in retaining ring. However, other attachment mechanisms such as a threaded nuts and flange bolts, for example, can also be used. Moreover, anti-rotation features can be added, including, for example, a keyed boss and bracket assembly, a staked interface after assembly, compressed anti-rotation washers, a bolt flange pattern, or a matched drill stake and bolt hole assembly.

The drawing figures illustrate an exemplary embodiment of a low-profile cylinder mount configured for assembly with a cylindrical pressure vessel. The mount and pressure vessel assembly, in an exemplary embodiment, occupies no more than the space or volume of a rectangular prism having a length defined between ends of pressure vessel 10 along longitudinal axis 12. A common width and height of the rectangular prism are defined by a diameter of the cylindrical pressure vessel 10. As shown in FIGS. 1-3B, mount 14 in an exemplary embodiment includes bracket 16, vibration isolators 18, and retainer 20, which is configured for attachment to neck 22 of pressure vessel 10 (such as a neck portion of a boss, for example).

Figure 2:
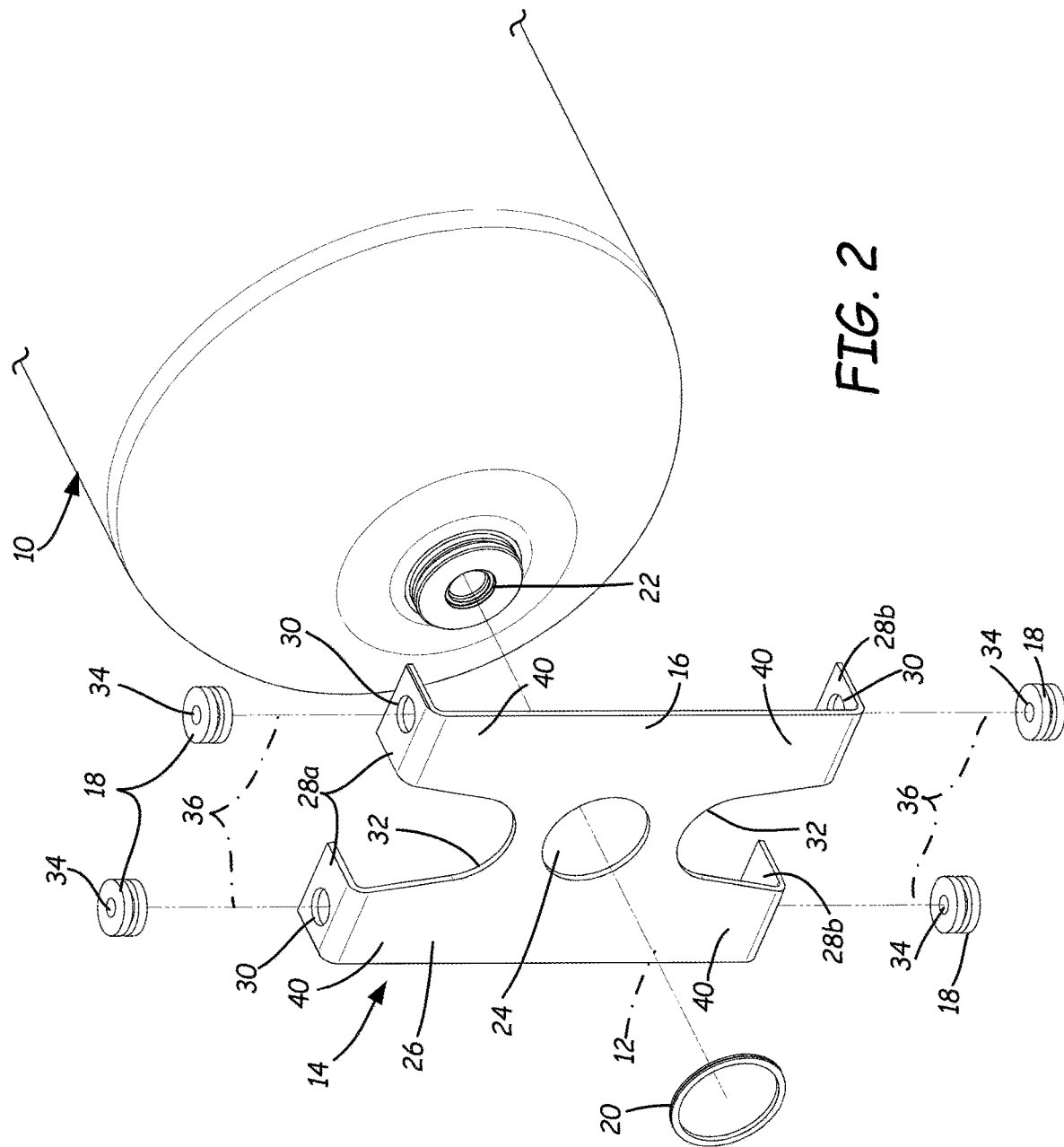
FIG. 2 is a partial perspective view of the pressure vessel and mount of FIG. 1 in an exploded configuration.

As shown in FIGS. 1 and 2, bracket 16 of mount 14 is attached to pressure vessel 10 by passing at least a portion of neck 22 of pressure vessel 10 through aperture 24 of bracket 16. This results in the assembly configuration of bracket 16 and pressure vessel 10 shown in FIG. 1. Thereafter, retainer 20 is positioned on neck 22 to attach bracket 16 to neck 22. In an exemplary embodiment, retainer 20 is provided in the form of a resilient polymeric retaining ring having an annular shape and snap features configured to cooperate with complementary structures on neck 22 and/or aperture 24.

In an exemplary embodiment, central aperture 24 of bracket 16 is provided on a substantially planar plate 26 that is oriented substantially orthogonal to longitudinal axis 12. Flanges 28 extend substantially orthogonally from plate 26 in a direction toward a body of pressure vessel 10. An upper flange(s) may be referenced with label 28a, while a lower flange(s) may be referenced with label 28b. Flanges 28 are provided, in an exemplary embodiment, with attachment mechanisms 30 configured for the mounting of vibration isolators 18. In an exemplary embodiment, each attachment mechanism 30 is an aperture configured for a snap-fit engagement with a respective vibration isolator 18. In the illustrated embodiment, bracket 16 includes cut out portion 32, which removes material from portions of plate 26 and flange 28. Accordingly, savings in materials and weight of bracket 16 can be achieved. It is contemplated that such cut out portions can be shaped and positioned other than as illustrated. However, it is recognized that there will be a trade-off between the strength of bracket 16 and the configuration and amount of material used for forming bracket 16.

In an exemplary embodiment, each vibration isolator 18 includes an aperture 34 that is coincident along insertion axis 36 with attachment mechanism 30 on flange 28. Accordingly, a fully connected assembly 38 of pressure vessel 10 and mount 14 can be connected via attachment mechanism 30 to another structure, such as a vehicle frame, for example. For example, bolts or other fasteners can be inserted through apertures 30, 34 to attach mount 14, and therefore the respective pressure vessel 10, to other structures at flanges 28. As shown in the drawing figures, assembly 38 takes up only the space of a rectangular prism R defined by the length, width and height (e.g., diameter D) of pressure vessel 10. Accordingly, mount 14 offers a low profile means by which to attach pressure vessel 10 to other structures in a limited amount of space.

In an exemplary embodiment, each vibration isolator 18 is formed of a resilient, compressible material such as rubber or polymer, for example. In an exemplary embodiment, vibration isolators 18 absorb vibration from a vehicle to which the flanges 28 are attached, thereby dampening such vibrations to isolate pressure vessel 10 therefrom. Moreover, due to their compressible nature, vibration isolators 18 can also absorb some axial growth and/or displacement of pressure vessel 10 along longitudinal axis 12, as well as slight rotational displacement about axis 12.

Bracket 16 is formed in an exemplary embodiment of a durable and strong metal material such as steel or aluminum, for example. When mount 14 is contemplated for use with a particularly long pressure vessel 10, bracket 16 can be formed of a spring steel to further deflect and absorb displacement of the pressure vessel 10 relative to the structure to which the mount is attached at attachment mechanism 30 of flanges 28.

While a snap-in retaining ring 20 is disclosed for maintaining bracket 16 on neck 22 of pressure vessel 10, it is contemplated that other structures can be used to achieve this attachment. Other suitable retainers include, for example, a threaded nut, a securing flange that passes over at least a portion of neck 22, or a split bracket that can be tightened about neck 22 using a tightening bolt, for example.

In the illustrated embodiment, no anti-rotation features are explicitly shown to prevent rotation of bracket 16 about longitudinal axis 12 of pressure vessel 10. However, if such anti-rotation features are desired, suitable structures include, for example, non-circular keyed configurations of neck 22 and aperture 24 of bracket 16; a staked or locked feature for assembly 38; the use of compressed anti-rotation washers; or the use of keyed bolt.

A non-limiting example of a disclosed mount 14 is configured for attachment to a neck 22 of a pressure vessel 10, the pressure vessel 10 having a substantially cylindrical body having a diameter D. The mount 14 includes bracket 16, vibration isolators 18 and retainer 20. In an exemplary embodiment, bracket 16 is configured with a central plate 26 having a height H that is approximately equal to or less than the diameter D, the central plate 26 having a width W that is approximately equal to or less than the diameter D, and the central plate 26 having an aperture 24 therethrough. A first flange 28a is located at a first side of the central plate 26, the first flange 28a being oriented substantially perpendicular to the central plate 26 and extending toward the body of pressure vessel 10. A second flange 28b is located at a second side of the central plate 26 opposite the first side, the second flange 28b being oriented substantially perpendicular to the central plate 26 and substantially parallel to the first flange 28a, the second flange extending toward the body of pressure vessel 10. A first vibration isolator 18 is disposed on the first flange 28a. A second vibration isolator 18 disposed on the second flange 28b. A retainer 20 is disposed proximate the aperture 24 and is configured to accept at least a portion of the neck 22 of the pressure vessel 10.

In an exemplary embodiment, central plate 26 has a cut-out portion 32 that borders at least one of the first and second flanges 28. In an exemplary embodiment, cut-out portion 32 does not border the aperture 24. In an exemplary embodiment, central plate 26 is substantially planar. In an exemplary embodiment, cut-out portion 32 results in the provision of legs 40 on central plate 26. Each leg 40 supports a flange 28. In some embodiments, depending on the material and thickness of central plate 26, each leg 40 can flex independently to accommodate slight movements between pressure vessel 10 and a structure to which mount 14 is attached.

In an exemplary embodiment, first flange 28a includes a second aperture 30 therethrough. In an exemplary embodiment, first vibration isolator 18 is connected to the first flange 28a at the second aperture 30. In an exemplary embodiment, the first vibration isolator 18 includes a third aperture 34 that is coincident with the second aperture 30. In an exemplary embodiment, retainer 20 is annular. In an exemplary embodiment, retainer 20 includes a snap feature configured to cooperate with the neck 22.

A non-limiting example of a disclosed assembly 38 includes a pressure vessel 10 and mount 14. The pressure vessel 10 includes a substantially cylindrical body having a diameter D and a length L. The pressure vessel 10 also includes neck 22. The mount 14 includes a central plate 26 having an aperture 24 therethrough configured to accept a portion of the neck 22 of the pressure vessel 10. The mount 14 also includes a first flange 28a located at a first side of the central plate 26 and extending toward the body. The mount 14 also includes a second flange 28b located at a second side of the central plate 26 opposite the first side and extending toward the body. The assembly 38 occupies no more than a rectangular prism space R defined by the length L, a width equal to the diameter D, and a height equal to the diameter D.

In an exemplary embodiment, assembly 38 further includes a first vibration isolator 18 disposed on the first flange 28a and a second vibration isolator 18 disposed on the second flange 28b. In an exemplary embodiment, assembly 38 further includes a retainer 20 disposed proximate the aperture 24 and configured to retain the pressure vessel 10 and mount 14 together in the assembly 38.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa

The invention claimed is:

1. An assembly of a pressure vessel and mount, the assembly including:
    the pressure vessel having a diameter and a length and including:
        a substantially cylindrical body having a domed end; and
        a boss neck;
        wherein the substantially cylindrical body tapers from a portion having the diameter to the boss neck at the domed end; and
    the mount including:
        a central plate having an aperture therethrough configured to accept a portion of the boss neck;

a first flange located at a first side of the central plate and extending toward the body; and a second flange located at a second side of the central plate opposite the first side and extending toward the body;

wherein the assembly occupies no more than a rectangular prism space defined by the length, a width equal to the diameter of the substantially cylindrical body, and a height equal to the diameter of the substantially cylindrical body.

2. The assembly of claim 1 further including:

a first vibration isolator disposed on the first flange; and a second vibration isolator disposed on the second flange.

3. The assembly of claim 1 further including a retainer disposed proximate the aperture and configured to retain the pressure vessel and mount together in the assembly.

4. The assembly of claim 3, wherein the retainer is annular.

5. The assembly of claim 1 wherein the central plate is substantially planar.

6. The assembly of claim 1 wherein the first flange includes a second aperture therethrough.

7. The assembly of claim 6 further including a vibration isolator connected to the first flange at the second aperture.

8. The assembly of claim 7 wherein the vibration isolator includes a third aperture that is coincident with the second aperture.

9. The assembly of claim 1 wherein the first flange is oriented substantially perpendicular to the central plate.

10. The assembly of claim 9 wherein the second flange is oriented substantially perpendicular to the central plate.

11. The assembly of claim 1 wherein the mount is formed of a spring steel.

12. An assembly of a pressure vessel and mount, the assembly including:

the pressure vessel including:

a substantially cylindrical body having a diameter and a length; and a neck;

the mount including:

a central plate having an aperture therethrough configured to accept a portion of the neck of the pressure vessel;

a first flange located at a first side of the central plate and extending toward the body; and a second flange located at a second side of the central plate opposite the first side and extending toward the body; and an annular retainer disposed proximate the aperture and configured to retain the pressure vessel and mount together in the assembly, wherein the retainer includes a snap feature configured to cooperate with the neck;

wherein the assembly occupies no more than a rectangular prism space defined by the length, a width equal to the diameter of the substantially cylindrical body, and a height equal to the diameter of the substantially cylindrical body.

13. The assembly of claim 12 wherein the central plate is substantially planar.

14. The assembly of claim 12 wherein the first flange includes a second aperture therethrough.

15. The assembly of claim 14 further including a vibration isolator connected to the first flange at the second aperture.

16. The assembly of claim 15 wherein the vibration isolator includes a third aperture that is coincident with the second aperture.

17. The assembly of claim 12 wherein the first flange is oriented substantially perpendicular to the central plate.

18. The assembly of claim 17 wherein the second flange is oriented substantially perpendicular to the central plate.

19. The assembly of claim 12 wherein the mount is formed of a spring steel.

\* \* \* \* \*